(12) United States Patent
Ezrielev et al.

(10) Patent No.: US 12,437,070 B2
(45) Date of Patent: Oct. 7, 2025

(54) RANSOMWARE DETECTION VIA MONITORING OPEN FILE OR PROCESS

(71) Applicant: Dell Products L.P., Round Rock, TX (US)

(72) Inventors: Ofir Ezrielev, Be'er Sheba (IL); Yeh'iel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 144 days.

(21) Appl. No.: 18/194,624

(22) Filed: Apr. 1, 2023

(65) Prior Publication Data

US 2024/0330460 A1      Oct. 3, 2024

(51) Int. Cl.
*G06F 21/56* (2013.01)
*H04L 9/40* (2022.01)

(52) U.S. Cl.
CPC .......... *G06F 21/566* (2013.01); *G06F 21/562* (2013.01); *H04L 63/145* (2013.01)

(58) Field of Classification Search
CPC ...... G06F 21/566; G06F 21/562; G06F 21/56; H04L 63/145; H04L 9/40
See application file for complete search history.

(56) References Cited

U.S. PATENT DOCUMENTS

| | | | |
|---|---|---|---|
| 9,740,870 B1 | 8/2017 | Shepard | |
| 10,503,904 B1 * | 12/2019 | Singh | G06F 21/566 |
| 10,963,583 B1 | 3/2021 | Shimony | |
| 12,175,124 B2 | 12/2024 | Strathman et al. | |
| 2002/0162017 A1 | 10/2002 | Sorkin et al. | |
| 2007/0271614 A1 | 11/2007 | Capalik | |
| 2009/0241187 A1 | 9/2009 | Troyansky | |
| 2017/0206353 A1 | 7/2017 | Jai et al. | |
| 2017/0324755 A1 * | 11/2017 | Dekel | G06F 21/60 |
| 2018/0018458 A1 * | 1/2018 | Schmugar | G06F 21/554 |
| 2018/0189490 A1 | 7/2018 | Maciejak et al. | |
| 2019/0109870 A1 | 4/2019 | Bedhapudi et al. | |
| 2019/0114439 A1 | 4/2019 | De et al. | |
| 2020/0106808 A1 * | 4/2020 | Schütz | H04L 63/0263 |
| 2021/0012002 A1 | 1/2021 | Rosenthal | |
| 2021/0117543 A1 * | 4/2021 | Araujo | G06F 16/1734 |
| 2021/0182392 A1 | 6/2021 | Hargrove | |
| 2022/0083645 A1 | 3/2022 | Kanai | |
| 2023/0231881 A1 | 7/2023 | Radhakrishnan et al. | |

(Continued)

FOREIGN PATENT DOCUMENTS

| | | | | |
|---|---|---|---|---|
| BR | 112018070251 B1 * | 6/2023 | | |
| CN | 106650423 A * | 5/2017 | ............. | G06F 21/53 |

OTHER PUBLICATIONS

'Royal Ransomware', Vedere Labs, Dated Jan. 10, 2023, 7 pages (Year: 2023).

(Continued)

*Primary Examiner* — Jayesh M Jhaveri
(74) *Attorney, Agent, or Firm* — Workman Nydegger

(57) ABSTRACT

A bait file owned by a bait process is created and locked in a computing system. Attempts or access the bait file or kill the bait process are detected. The process attempting to access the bait file or kill the bait process is viewed as malicious and protective operations are performed in the computing system.

18 Claims, 6 Drawing Sheets

(56) References Cited

U.S. PATENT DOCUMENTS

2024/0330447 A1 10/2024 Ezrielev et al.
2024/0333764 A1 10/2024 Ezrielev et al.

OTHER PUBLICATIONS

LockFileEx—Microsoft Learn, Dated Oct. 6, 2023, 4 pages (Year: 2023).
(Salem, Eli et al., 'Royal Rumble: Analysis of Royal Ransomware', Cyberreason, published Dec. 16, 2022) (Year: 2022).

* cited by examiner

RANSOMWARE DETECTION VIA MONITORING OPEN FILE OR PROCESS

FIELD OF THE INVENTION

Embodiments of the present invention generally relate to a computing forensics system. More particularly, at least some embodiments of the invention relate to systems, hardware, software, computer-readable media, and methods for protecting data from threats including cyber threats.

BACKGROUND

Most entities rely on computing systems. These computing systems include applications and their data. Hospitals, for example, have applications that require/use/generate data related to patients, medicines, procedures, and the like. Much of this data is confidential. Airlines rely on applications and data to manage flights, passengers, employees, and more.

These entities exert substantial efforts to ensure that their data is available when needed. These efforts include generating backups of the production systems/data. Generating backups helps ensure that in the event of data loss, the production systems can be restored, and operations can resume.

Data corruption or loss, however, can occur in different ways. The loss of a disk drive due to hardware failure, for example, can usually be quickly resolved. The loss of data (e.g., inability to access the data) due to malware or other cyber threats can be much more problematic.

Malware that infects a production system, for instance, can cause severe problems in the entity's operations as the data may not be accessible. In addition to infecting production systems, malware may also infect backups. Recovering from malware can be complicated, difficult, and costly due to the potentially unknown effects of the malware. Further, the delay associated with recovering the production system may be further delayed when law enforcement or insurance companies are involved.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection systems and data protection operations. More particularly, at least some embodiments of the invention relate to systems, hardware, software, computer-readable media, and methods for detecting and/or responding to malware and other cyber-attacks.

In general, example embodiments of the invention relate to data protection operations including, but not limited to, data protection operations, backup operations, snapshot operations, restore/recover operations, point-in-time backup/recover operations, malware response operations, malware evaluation operations, malware detection operations or the like or combinations thereof.

The term malware as used herein and by way of example, may refer to ransomware, viruses, rootkits, spyware, adware, trojans, worms, phishing attacks, or other unwanted software or cyber-attacks. Malware may also be referred to as a computing process or application.

Embodiments of the invention relate to a forensic engine, or a forensics kit configured to evaluate, detect and/or respond to malware. When malware is detected in a production system (or in a backup), the forensic engine may perform a snapshot or other backup of the production system. The snapshot, which includes the malware, is an infected snapshot and may be deployed to a forensics environment such that the forensic engine can attempt to learn how the malware operates, how the production system was infected, or the like. This is described in U.S. Ser. No. 17/937,882 filed Oct. 4, 2022, which application is incorporated by reference in its entirety. The forensic engine allows the malware to operate in an observed manner such that operational characteristics of the malware can be learned and evaluated. This may include determining how and when files are altered (e.g., deleted, changed, encrypted), how and where data is sent by the malware, how the malware spreads, how the malware responds to anti-malware software, how the malware tries to avoid detection, how the malware infects backups, and the like.

Embodiments of the invention allow the forensic engine to learn these operational characteristics or other behavior. While learning the operational characteristics or after learning the operational characteristics, the forensic engine may be configured to operate in a proactive manner. For example, the forensic engine can trick or cause the malware to send a response malware back to the malware's source. The forensic engine may also emulate communications of the malware. The forensics engine may be able to mitigate, or reverse damage caused by the malware in the production system.

Figure 1:
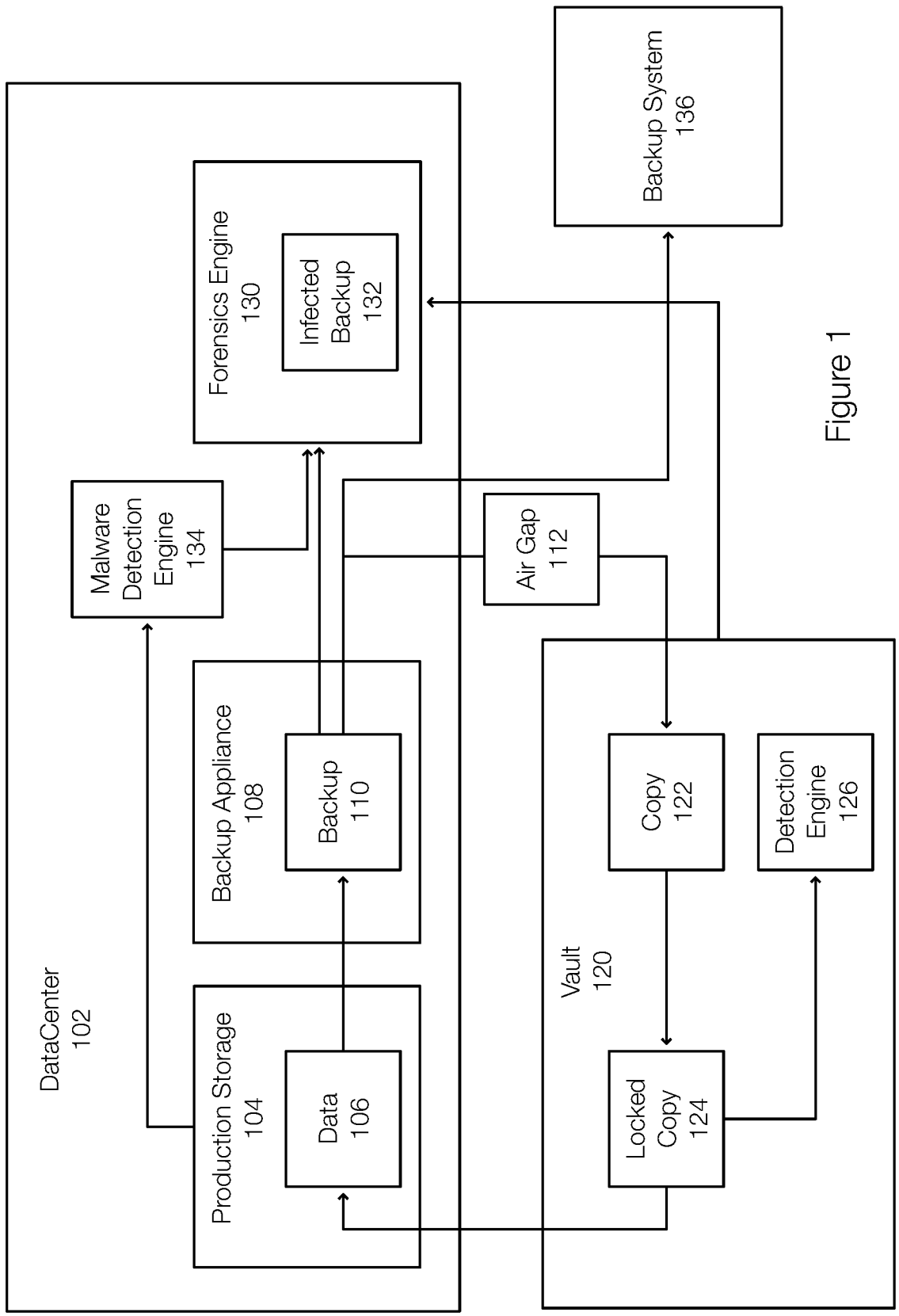
FIG. 1 discloses aspects of a forensic engine or kit configured to perform data protection operations including learning operations performed by a malware and responding to the malware.

FIG. 1 discloses aspects of a forensic engine configured to perform data protection operations including malware related operations. FIG. 1 illustrates a datacenter 102 that includes production storage 104, which stores production data 106. The datacenter 102 may also host applications associated with the data 106. The production data 106 may include data required or accessed by users, applications, or the like. The data 106 may include files, objects, blocks, a database, emails, images, videos, documents, spreadsheets, presentations, or the like or combination thereof.

Although FIG. 1 illustrates production storage 104 of a datacenter 102, the production storage 104 may be an on-premise storage system, an edge system storage, a cloud-based system or the like or combination thereof. The production storage 104 may include storage devices such as hard disk drives.

A backup appliance 108 is configured to generate and store backups of the data 106 (and/or applications), represented as the backup 110. The backup 110 may be or include a full backup, a synthetic backup, incremental backups, snapshots, or the like. The backup appliance 108 may be a virtual appliance or a physical appliance. The backup appliance 108 may coordinate with other backup appliances at remote locations. This allows backups to be stored remotely.

More generally, the backup appliance 108 may protect data, applications, or the like. The backup appliance 108 may transmit the backup 110 to a vault 120, which may be protected by an air gap 112 controlled by the vault 120. This allows a copy 122 (e.g., a backup) of the data 106 to be stored in the vault 120 only when a connection is available (e.g., the air gap 112 is configured to allow communications). After ingestion into the vault 120, the copy 122 is locked to generate a locked copy 124. The locked copy 124 is immutable in one example. The vault 120 may be created in the datacenter 102 or in another location that is remote from the data 106 and/or the backup appliance 108. In other examples, backups may be stored in storage systems that are not protected by an air gap mechanism. For example, the backup appliance 108 may regularly transmit backups to a backup system 136 in the cloud or other location.

During a recovery operation, the data 106 may be recovered from the locked copy 124 (or other backup in the vault 120) or from the backup system 136. In some examples, the data 106 may be recovered from the copy 122 if necessary. In one example, the backup 110 may be a namespace that is backed up to a namespace in the vault 120. The backup 110 may be transmitted to a namespace in the vault 120 as the copy 122. Next, the copy 122 may be copied to another namespace and retention locked, which results in the locked copy 124.

The air gap 112 may not be required but provides a more secure backup environment. Once the locked copy 124 is generated and retention locked, the immutability is guaranteed in one example. For example, the locked copy 124 is secure from attack vectors that adversely impact backups because the vault 120 may not be accessible, due to the air gap 112, which is controlled from inside the vault 120 in one example.

In one example, the vault 120 may be a target site configured to store backups received from the backup appliance 108. The vault 120 may be associated with a corresponding appliance that may be configured to store the backups in the target site and also perform restore or recover operations. In one example, the air gap 112 is not present and the value 120 may simply represent backup storage that stores backups received from the backup appliance 108.

The production storage 104 (or more generally the production system) may be associated with a malware detection engine 134 (malware engine 134). When the malware engine 134 detects malware in the production storage 104 or in the production system, the malware engine 134 may trigger the forensic engine 130 and/or perform other protective operations. The forensic engine 130 may be triggered in another manner or may include the malware engine 134.

When triggered, the forensic engine 130 may generate a snapshot (e.g., a point-in-time snapshot) or backup of the production system, which is illustrated as an infected backup 132. The infected backup 132 may be taken from the data 106, may be a PiT copy generated from the backup 110, or the like. In this example, the infected backup 132 may represent different types of backups.

Figure 2:
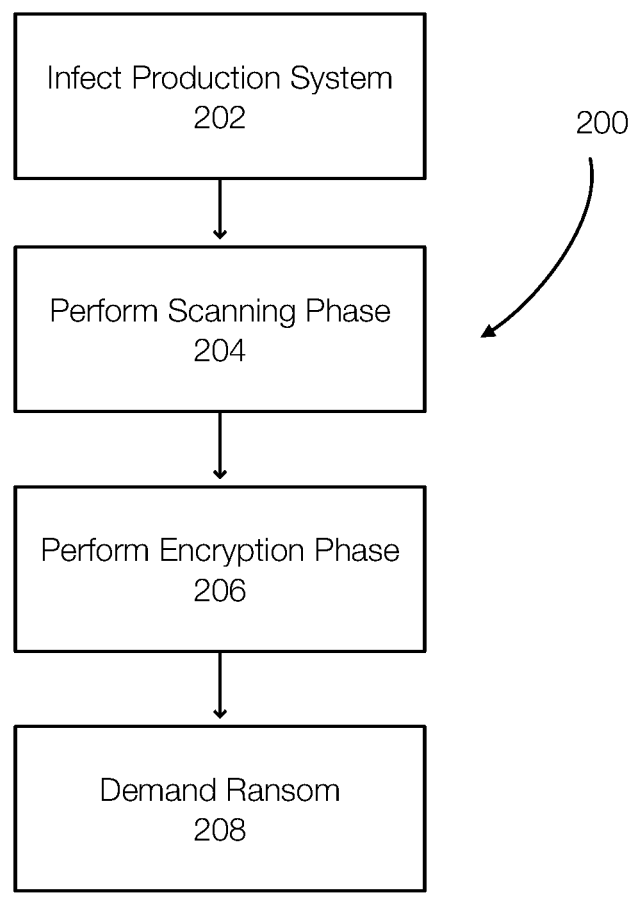
FIG. 2 discloses aspects of operational phases of a malware application or process.

FIG. 2 discloses aspects of malware operations. For example, ransomware is an example of malware that is configured or designed to block/prevent users from accessing their data until a ransom is paid. Ransomware is prevalent and is a significant concern for users everywhere. Embodiments of the invention are directed to detecting malware such as ransomware in real time or near real time in order to prevent or mitigate damage to the production system.

As illustrated in the method 200, ransomware, like other malware, may infect 202 a production system. Malware may gain access to the production system in different manners such as when a user visits an infected website, opens a malicious attachment or email, sends login information to a phishing site, or the like. Once the malware gains access to or infects a production system, the malware may operate in various phases. In a simple example, malware such as ransomware may simply begin encrypting data. This is possible because encryption functionality is often part of an operating system. Thus, the ransomware only needs to access the files, encrypt the files with an attacker-controlled key, and replace the original files with the attacker controlled encrypted files.

Many malware or ransomware variants may be more cautious in selecting files to encrypt or may generate a plan prior to encrypting the data. This may be performed to ensure system stability. More specifically, the malware may perform 204 a scanning phase 204. A scanning phase 204 may allow the malware to identify files that appear to have higher value, select files to encrypt, generate a mapping of files to encrypt, or the like. During this or other phases of operation, some malware may delete backup and shadow copies of files to make recovery without the decryption key more difficult. The scanning phase may also include attempts to infect other computing systems or the like. For example, a malware may gain access to a production data system and spend time trying to access an accounting system or spread to other unrelated computing systems.

Once the malware has scanned the production system and completed the scanning phase, an encryption phase may be performed 206. The encryption phase may be representative of various forms of attack. In another example, the malware may corrupt data (e.g., partially delete, partially overwrite). As previously stated, this may be performed using an attacker-controlled key and encryption functionality of the operating system. Once the files are encrypted, a ransom may be demanded 208. The malware may only encrypt the targeted files or perform other operations in the infected computing system.

During the scanning and/or encryption phases of a malware application or process, the malware may discover that some of the files in the computing system are locked (e.g., for editing) by another process. The malware, which tends to be inclusive, aims to break that ownership relation by killing the locking process (e.g., the Conti ransomware). Killing the locking process or breaking the lock on a locked file is not trivial and typically occurs in very specific scenarios and for very specific reasons.

Embodiments, as a result, relate to detecting malware based on malware attempts to access locked files. In one example, a bait file or honeypot file (or files) may be created in the computing system. Bait files may be owned by a data protection related process (a bait process). The primary purpose of the bait process is to own the bait file such that access attempts can be detected and evaluated.

The bait process is monitored for access attempts or kill attempts. If another process attempts to kill the bait process or otherwise access the bait file or, in effect, break the lock on the bait file, the access attempt can be detected by the malware detection engine. Stated differently, the operating system may report the access attempt and the malware detection engine can response by blocking the killing process from executing in the computing system. This may reduce the extent to which a production system is compromised and/or prevent the malware from operating.

Embodiments of the invention thus allow malware to be detected and further advantageously allow inline production analysis to be integrated with offline analysis in the vault or other backup system. More specifically, an attack can be stopped/mitigated by detecting access attempts performed with respect to bait files. A system may have more than one bait file with different configurations and attributes to increase the likelihood of detecting malware. The attributes may be configured to draw diverse malware, including multiple different ransomware, to the bait file or to one or more of the bait files.

For example, a malware process may read a file to determine or evaluate the contents. A file containing social security numbers and birthdates, for example, may be considered more valuable than a file containing a description of the business. By providing multiple bait files, each bait file can be configured to have a different type of value. One bait file may be populated with false financial data while another may be filled with false personal information (e.g., social security numbers, birthdates). Attributes can thus relate to the content of the file, metadata of the file, or the like.

Figure 3A:
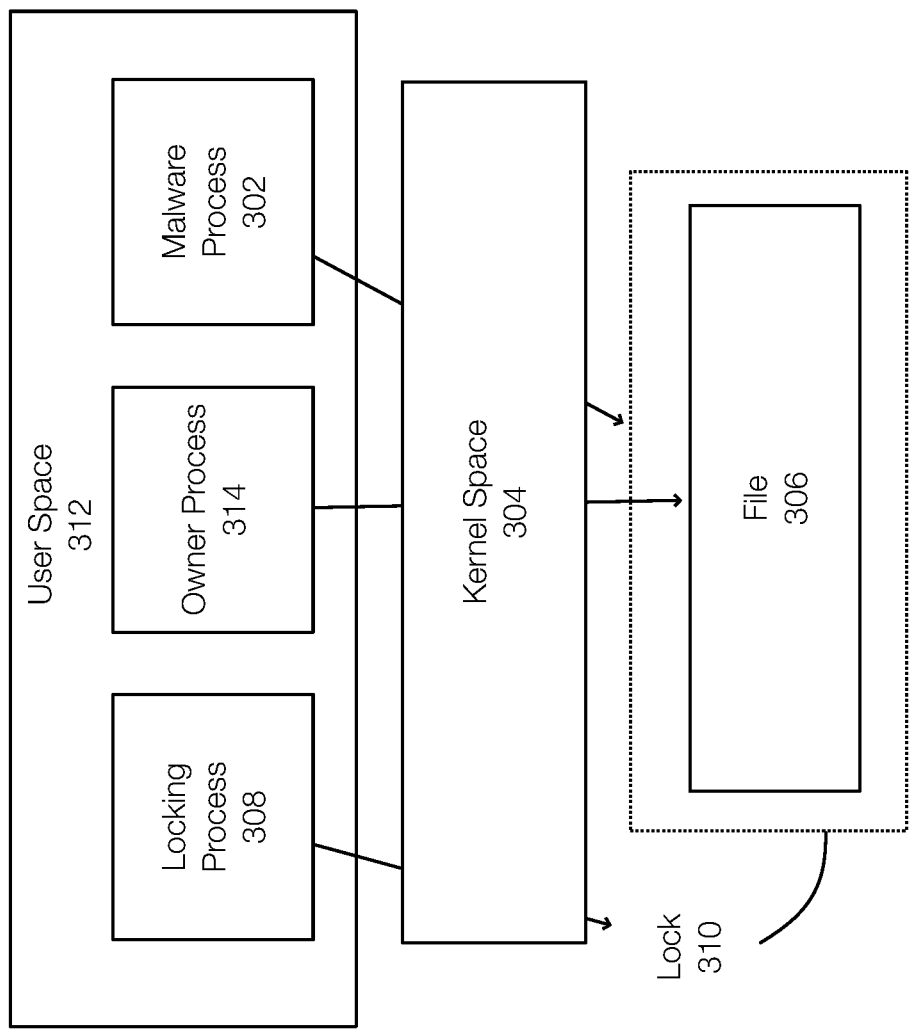
FIG. 3A discloses aspects of malware operating in a computing system or environment.

FIG. 3A discloses aspects of a malware process operating in a computing environment. FIG. 3A illustrates an application or user space 312 and a kernel space 304, which are both aspects of an operating system. In general, the user space 312 includes memory in which application software executes. The kernel space 304 is reserved for the operating system, device drivers, or other privileged processes and generally has control over the computing system.

Malware such as the malware process 302 typically operates in the user space 312. Embodiments of the invention may operate in the kernel space 304. Because the kernel space 304 is separated or hidden from the user space 312, this allows the malware process 302 to be detected efficiently in the kernel space 304 in a manner that may not alert the malware process 302.

FIG. 3A illustrates a file 306 that is associated with an owner process 314. The owner process 314 may create a lock 310 on the file 306 using a locking process 308. The locking process 308 and lock 310 are illustrated by way of example as files can be locked in a variety of different manners.

During operation, the malware process 302 may determine that the file 306 is worth encrypting or corrupting. This determination may be based on the fact that the file is locked, based on the file's attributes, based on the process that owns the file, or for other reasons. When the malware process 302 determines that the file 306 is worth encrypting, the malware process 302 attempts to break the lock 310. An attempt to break the lock 310 may be made by the malware process 302 by default without consideration of the value of the file.

If the attempt to break the lock 310 is successful, the malware process 302 may take ownership of the file 306 and perform an encryption operation on the file 306.

Figure 3B:
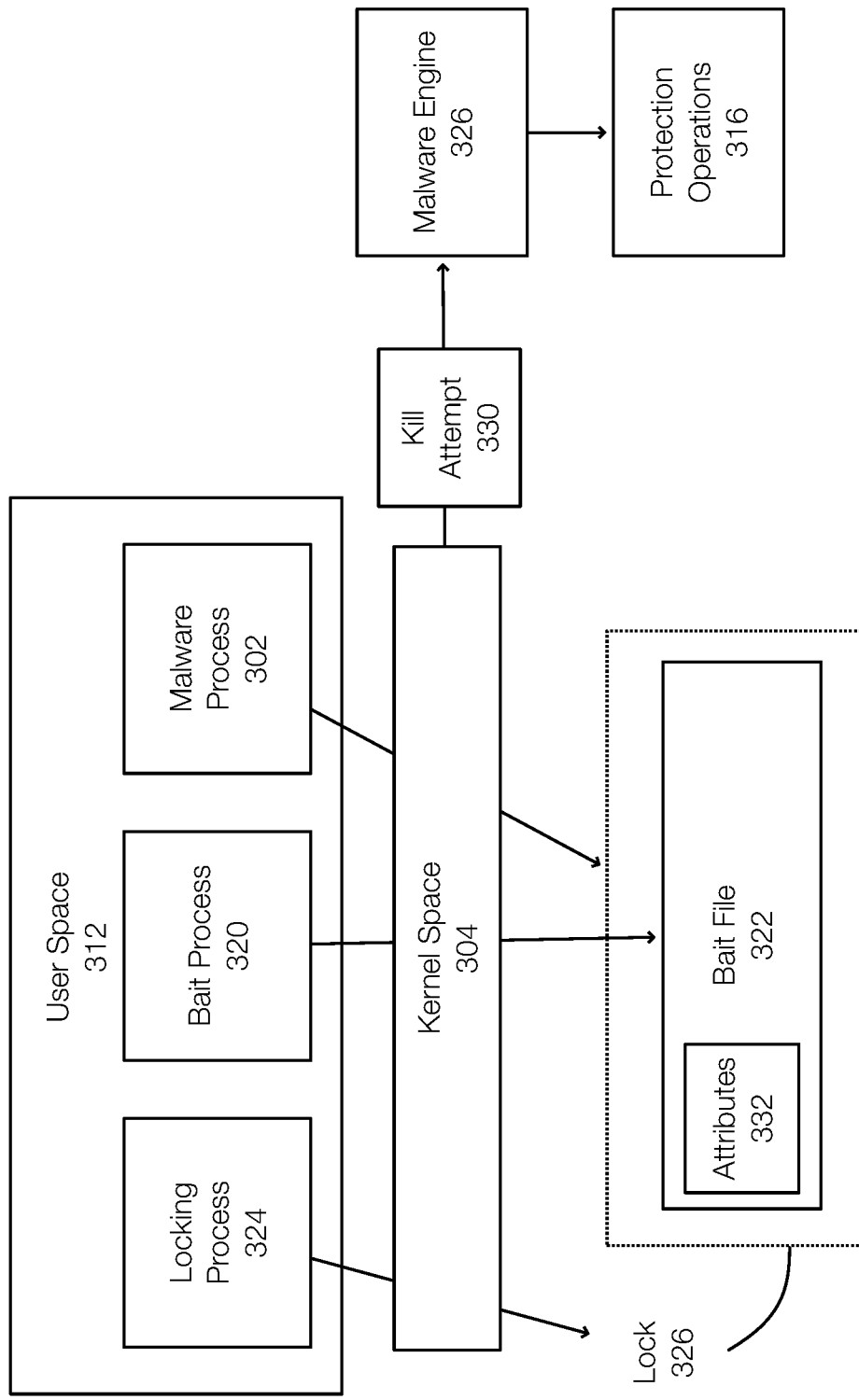
FIG. 3B discloses aspects of detecting a malware process or application operating in a computing system or environment.

FIG. 3B discloses aspects of detecting a malware process or application operating in a computing environment. In FIG. 3B, a malware process 302 may be operating in a user space 312. In this example, a bait process 320 is operating in the user space 312. The bait process 320 is an owner of a bait file 322, which may be associated with attributes 332. The bait file 322 is locked with a lock 326 by a locking process 324.

In one example, the malware process 302 may attempt to access the attributes 332 of the bait file 322 to determine or assign a value to the bait file 322. Thus, the attributes 332 (e.g., read only, immutable, permissions) may be configured to make the bait file 322 appear valuable and worth encrypting by the malware process 302. In one embodiment, the bait file 322 is configured as an attractive prize that is worth encrypting.

If an attempt is made to break the lock 326, for example, by the malware process 302, the attempt is detected by the malware engine 326. This allows the malware engine 326 perform or initiate a protection operation 316 or protection operations that may have different results. One protection operation is to block the malware process 302 from accessing any files. The malware process 302 may be blocked, terminated, quarantined, or the like when an attempt to break the lock 326 on the bait file 322 is detected. In effect, the bait file 322 is a locked file that tempts the malware process 302 to reveal its existence in the computing system by attempting to access the bait file 322 in some manner. Locking the bait file 322 can make the bait file 322 appear valuable to the malware process 302, which results in an attempt to break the lock 326 and subsequent detection of the malware process 302.

More specifically in one example, the malware engine 326 may operate in the kernel space 304. When a kill attempt 330 by the malware process 302 is detected or performed with respect to the bait file 322, the kill attempt 330 is detected by the malware engine 326 (or by the operating system, which reports the kill attempt 339) and protection operations 316 are performed. This allows the malware process 302 to be detected in the kernel state or hidden from the malware process 302. This may allow remedial operations to be performed, such as preventing shadow copies from being deleted, preventing writes or overwrites to other files, disabling encryption functionality, or the like.

In one example, a snapshot may be generated and the malware process 302, now detected, may be allowed to operate in a forensic environment.

Figure 4:
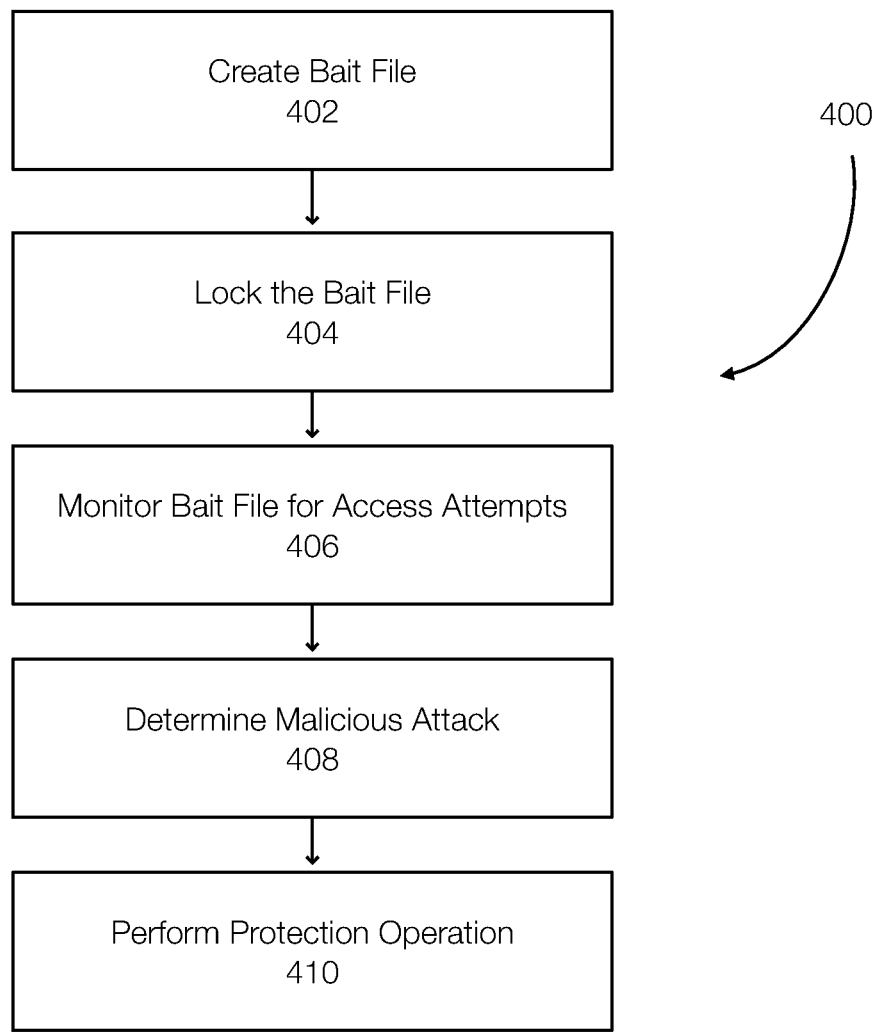
FIG. 4 discloses aspects of detecting malware and performing protection operations.

FIG. 4 discloses aspects of detecting malware and performing protection operations. The method 400 is configured to facilitate the process of detecting malware that may be present and/or operating in a computing environment. Malware applications or processes can be detected when they perform actions that are, in one example, unexpected or unusual or the result of bait. In this example, a file is created and locked and may be configured to appear valuable. Because this file is intended to be locked and is, in effect, malware bait, any attempt to unlock the file or remove the lock is viewed as unexpected or unusual.

In the method 400, a bait file is created 402 and locked 404. The process of creating 402 the bait file may also include creating attributes. The bait file may be provided with attributes to convey that the bait file is regularly accessed, widely used, or the like. Further the bait process that owns the bait file may be configured to perform operations such that the attributes vary over time to further disguise the operational purpose of the bait file as a honeypot to attract the interest of malware.

Thus, the bait file is monitored 406 for access attempts. An access attempt may include an attempt to kill the bait process that owns the file, remove the lock on the file, or the like. In addition, attempts to access the attributes, write to the file or the like may also constitute access attempts that, in the context of the bait file, are atypical or anomalous.

When an access attempt is detected, a malware engine may determine 408 that the access attempt is malicious and part of a malicious attack on the computing system. In one example, an attempt to break the lock (e.g., kill the bait process so that the bait file is released) is viewed as malicious. Attempts to read, move, or copy the file or its attributes or perform other operations may be viewed as malicious. When the access attempt is detected and/or viewed as malicious, protection operations may be performed 410. This may include terminating/blocking the process that performed the access attempt.

Embodiments of the invention allow malware to be detected when an attempt to kill a bait file owner process is performed in a computing system.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, malware detection operations, malware response operations, malware deployment operations, file locking operations, kill operations, file kill detection operations, or the like or combinations thereof. Further operations may include data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the PowerProtect Cyber Recovery and associated data protection software, and storage environments such as the Dell-EMC DataDomain or PowerProtect storage environments. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: monitoring a bait file stored in a storage system of a computing system, wherein the bait file is owned by a bait process, detecting an access attempt to the bait file by a process operating in the computing system, determining that the process is a malware process, and performing a protection operation on the malware process.

Embodiment 2. The method of embodiment 1, further comprising creating the bait file in the storage system.

Embodiment 3. The method of embodiment 1 and/or 2, further comprising locking the bait file in the storage system by a locking process.

Embodiment 4. The method of embodiment 1, 2, and/or 3, wherein the access attempt includes an attempt to remove a lock on the bait file or kill the bait process.

Embodiment 5. The method of embodiment 1, 2, 3, and/or 4, further comprising detecting the access attempt by a malware detection engine operating in a kernel space of the computing system.

Embodiment 6. The method of embodiment 1, 2, 3, 4, and/or 5, wherein the protection operation comprises blocking the process.

Embodiment 7. The method of embodiment 1, 2, 3, 4, 5, and/or 6, wherein the protection operation comprises terminating the process.

Embodiment 8. The method of embodiment 1, 2, 3, 4, 5, 6, and/or 7, wherein the protection operation comprises generating an infected snapshot and allowing the process to operating in a forensic environment, wherein the process is blocked in the computing system.

Embodiment 9. The method of embodiment 1, 2, 3, 4, 5, 6, 7, and/or 8, wherein the access attempt comprises accessing the bait file by any process other than the bait process or interfering with the bait process.

Embodiment 10. The method of embodiment 1, 2, 3, 4, 5, 6, 7, 8, and/or 9, further comprising configuring the bait file or attributes of the bait file such that the bait file appears valuable in the computing system to cause the process to perform the access attempt.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-12.

Embodiment 13. A system comprising a processor and memory configured to perform the operations, methods, or processes, or any portion of any of these, or any combination thereof disclosed herein.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
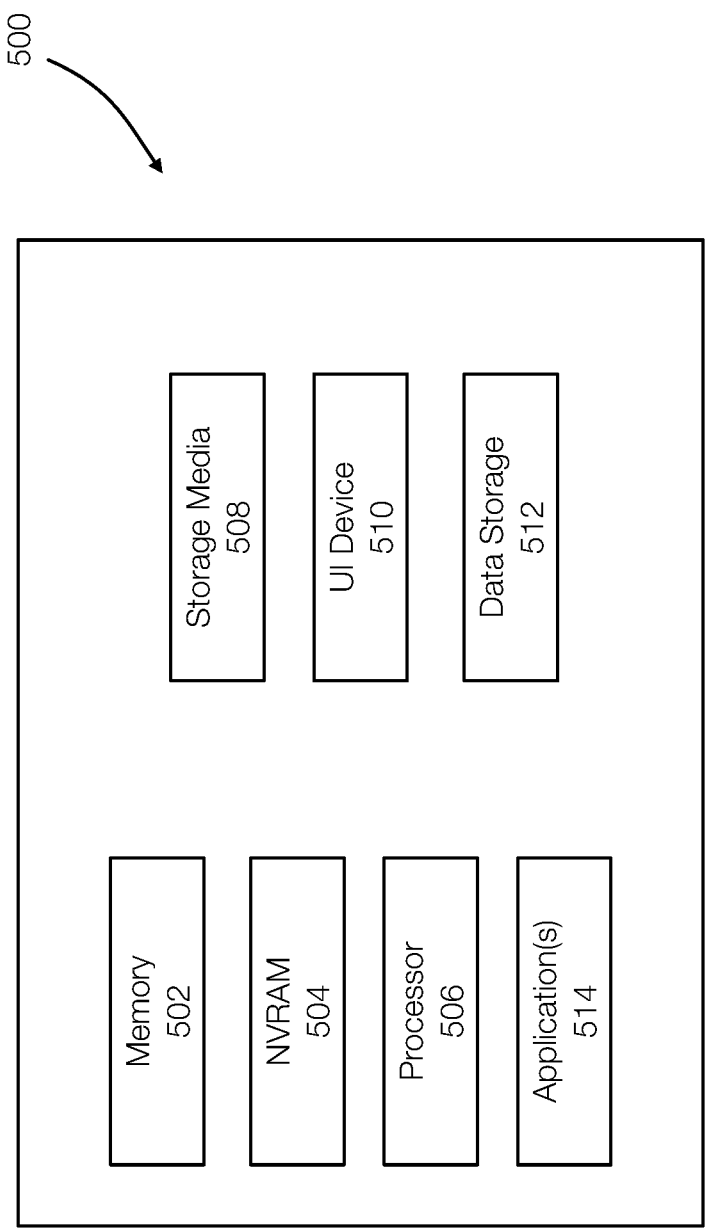
FIG. 5 discloses aspects of a computing device, system, or entity.

With reference briefly now to FIG. 5, any one or more of the entities disclosed, or implied, by the Figures and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random-access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid-state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   monitoring a bait file stored in a storage system of a computing system, wherein the bait file is owned by a bait process such that the bait file is locked by a locking process that is not a malware process, wherein the monitoring the bait file includes monitoring the bait process;
   detecting an access attempt to the bait file by a process operating in the computing system;
   determining that the process attempting to access the locked bait file is a malware process, wherein the access attempt includes an attempt to remove a lock on the bait file or kill the bait process; and
   performing a protection operation on the malware process.

2. The method of claim 1, further comprising creating the bait file in the storage system.

3. The method of claim 2, further comprising locking the bait file in the storage system by a locking process.

4. The method of claim 1, further comprising detecting the access attempt by a malware detection engine operating in a kernel space of the computing system.

5. The method of claim 1, wherein the protection operation comprises blocking the process.

6. The method of claim 1, wherein the protection operation comprises terminating the process.

7. The method of claim 1, wherein the protection operation comprises generating an infected snapshot and allowing the process to operate in a forensic environment, wherein the process is blocked in the computing system.

8. The method of claim 1, wherein the access attempt comprises accessing the bait file by any process other than the bait process or interfering with the bait process.

9. The method of claim 1, further comprising configuring the bait file or attributes of the bait file such that the bait file appears valuable in the computing system to cause the process to perform the access attempt.

10. A non-transitory storage medium having stored therein instructions that are executable by one or more hardware processors to perform operations comprising:
    monitoring a bait file stored in a storage system of a computing system, wherein the bait file is owned by a bait process such that the bait file is locked by a locking process that is not a malware process, wherein the monitoring the bait file includes monitoring the bait process;
    detecting an access attempt to the bait file by a process operating in the computing system;
    determining that the process attempting to access the locked bait file is a malware process, wherein the access attempt includes an attempt to remove a lock on the bait file or kill the bait process; and
    performing a protection operation on the malware process.

11. The non-transitory storage medium of claim 10, further comprising creating the bait file in the storage system.

12. The non-transitory storage medium of claim 11, further comprising locking the bait file in the storage system by a locking process.

13. The non-transitory storage medium of claim 10, further comprising detecting the access attempt by a malware detection engine operating in a kernel space of the computing system.

14. The non-transitory storage medium of claim 10, wherein the protection operation comprises blocking the process.

15. The non-transitory storage medium of claim 10, wherein the protection operation comprises terminating the process.

16. The non-transitory storage medium of claim 10, wherein the protection operation comprises generating an infected snapshot and allowing the process to operating operate in a forensic environment, wherein the process is blocked in the computing system.

17. The non-transitory storage medium of claim 10, wherein the access attempt comprises accessing the bait file by any process other than the bait process or interfering with the bait process.

18. The non-transitory storage medium of claim 10, further comprising configuring the bait file or attributes of the bait file such that the bait file appears valuable in the computing system to cause the process to perform the access attempt.

* * * * *